United States Patent [19]
Schuette et al.

[11] 3,944,057
[45] Mar. 16, 1976

[54] ARTICLE PROPELLING MECHANISM FOR CONVEYING APPARATUS

[75] Inventors: Thomas J. Schuette, Crestwood; Harold L. Turnbough, St. Louis, both of Mo.

[73] Assignee: Alvey, Inc., St. Louis, Mo.

[22] Filed: June 24, 1974

[21] Appl. No.: 482,004

[52] U.S. Cl.................... 198/160; 198/168
[51] Int. Cl.².......................... B65G 19/02
[58] Field of Search............ 198/34, 105, 160, 164, 198/167, 168, 173, 175, 176, 200

[56] References Cited
UNITED STATES PATENTS

| | | | |
|---|---|---|---|
| 1,979,799 | 11/1934 | Heineman | 198/173 X |
| 1,996,913 | 4/1935 | Evans | 198/34 |
| 2,932,380 | 4/1960 | Alvey, Jr. et al. | 198/173 |
| 2,984,330 | 5/1961 | Billeter | 198/105 X |
| 2,990,941 | 7/1961 | Peras | 198/173 |
| 3,545,596 | 12/1970 | Turnbough et al. | 198/160 X |
| 3,572,495 | 3/1971 | Luginbuhl | 198/34 |
| 3,612,316 | 10/1971 | Baldwin | 198/173 X |
| 3,650,376 | 3/1972 | Burgis et al. | 198/160 X |
| 3,690,439 | 9/1972 | Kuehl | 198/129 X |
| 3,812,955 | 5/1974 | Kopp | 198/173 X |

Primary Examiner—John J. Love
Assistant Examiner—Richard K. Thomson
Attorney, Agent, or Firm—Gravely, Lieder & Woodruff

[57] ABSTRACT

Conveying apparatus having primary support means of low friction character such as roller means or low friction slide or runner means to carry the weight of articles to be moved from place to place, and endless drag means propelled along the primary support and provided with motion exciting means adapted to engage and propel the articles. When the articles are to be accumulated a stop is imposed on the lead articles and thereafter the exciter means propels successive articles into the accumulation area and in each instance the exciter means passes underneath the articles to follow the path of the endless drag means. The exciter means is constructed to be easily replaced as it is the principal part that takes wear, and the degree of frictional contact with the articles may be selected to match the weight of the articles so as to require the least power and generate the least accumulative pressure.

2 Claims, 8 Drawing Figures

U.S. Patent  March 16, 1976  Sheet 1 of 3  3,944,057
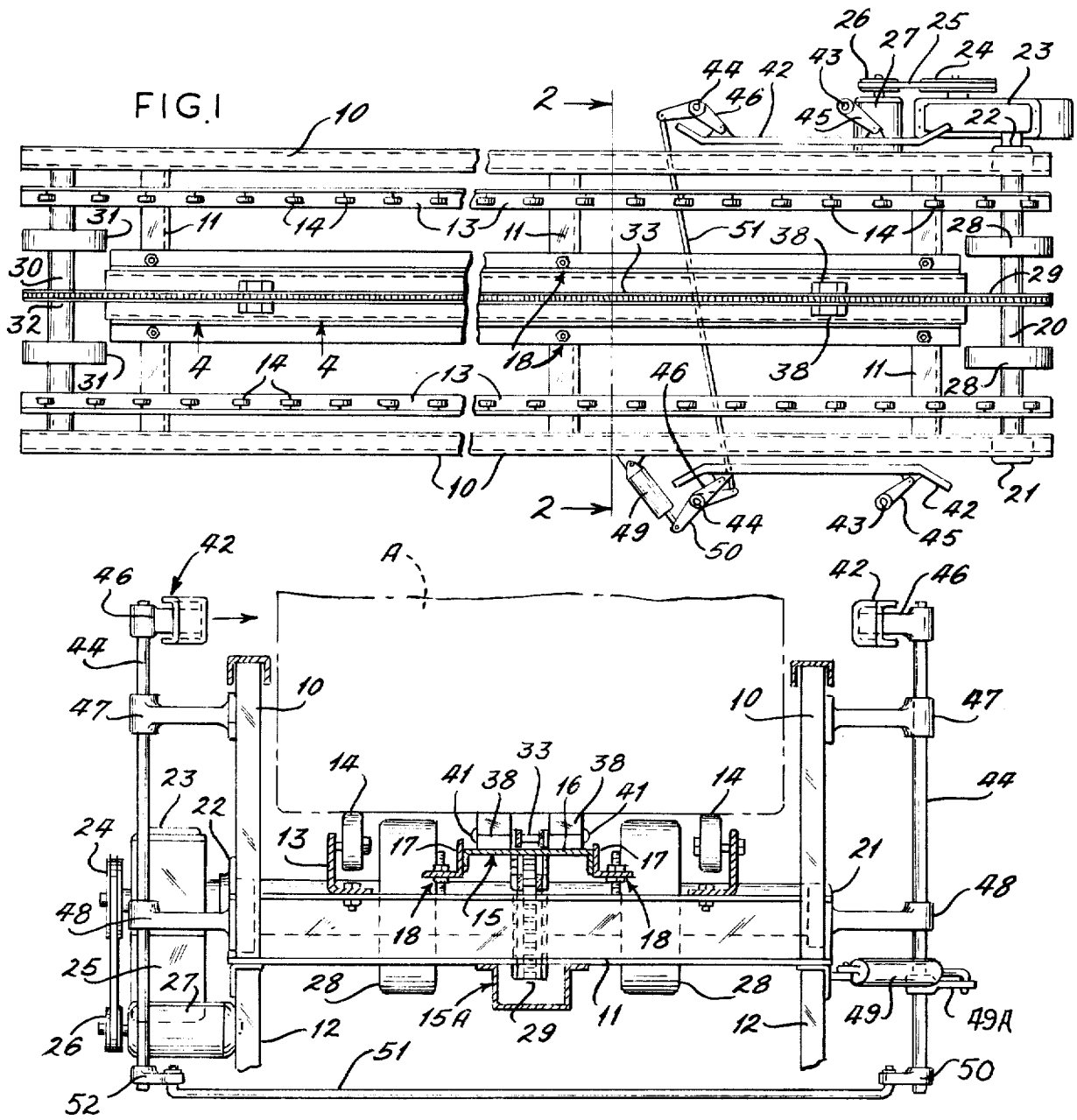
FIG.1
FIG.2
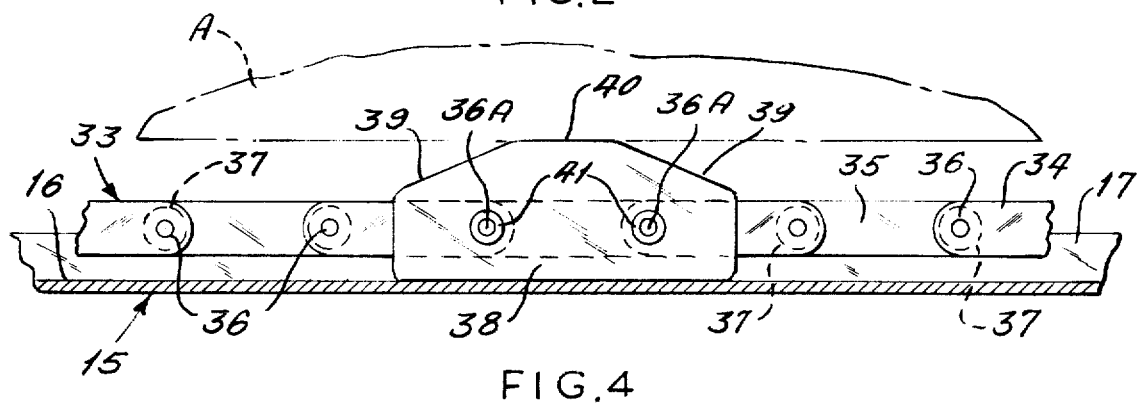
FIG.4

ARTICLE PROPELLING MECHANISM FOR CONVEYING APPARATUS

BRIEF SUMMARY OF THE INVENTION

This invention relates to conveyors of the general character in which articles are propelled along by drag means, and is particularly concerned with improvements in the articles motion exciting means and the action thereof on the articles, as well as other features to be pointed out.

Conveyors of the character in which articles are dragged or propelled along a lane of rollers or runners have embodied expensive structural components, have required a great deal of power, or have article drag means that cannot easily be adapted to the articles to be conveyed. Certain of the prior conveyors have relied upon the friction of a thickened belt but wear is severe on such belts and the quality of the friction contact soon deteriorates and article movement is unsure. In other conveyors use is made of spring fingers to engage and propel articles, but the fingers do not retain a uniform contact and are easily damaged by careless usage. Still other conveyors in the present class are provided with article drag means of block form that make up the propelling means and consequently have more than one drag block engaged with each article. These latter conveyor types require more power than is necessary, provide greater accumulative load pressure when loads are blocked against an end stop, and are complicated to make and assemble.

The present article propelling mechanism for conveyor apparatus embodies an organization of components which is an improvement on the conveyors heretofore found in the art. The principal objects of this invention are to provide an endless draw chain with article motion exciting means which can be adjusted to propel one or several articles, to provide a conveyor having means to assure the loading and unloading of articles, to provide motion exciting means that may be easily assembled or interchanged so that different materials may be used to suit the character of the articles to be conveyed, and to provide motion exciting means shaped to operate in either direction of movement so that a conveyor assembly may be reversed in direction without the need to change any part.

A preferred embodiment of this invention relating to an article propelling conveyor comprises two series of article supporting rollers or runners arranged in spaced apart positions with the upper surfaces of the rollers or runners defining the conveying path, endless drag means having an operative span directed lengthwise between said series of rollers or runners, a plurality of article motion exciting means connected to said endless drag means in spaced relation, a slide surface extending lengthwise beneath said operative span of the drag means, each of said motion exciting means being formed with a body portion slidingly engaged on said slide surface to support said drag means therefrom and with impelling surfaces presented to engage articles deposited on said two series of rollers or runners, and power means operatively connected to said drag means to repeatedly move said motion exciting means on said slide surface, whereby the impelling surfaces engage and propel the articles along said series of rollers or runners, said impelling surfaces being effective to push a single article or series of articles at at time, at other times to partially slide beneath the rearmost article of a group of articles in tandem accumulation so as to lift the rearmost article and increase the frictional propelling effort on the group, and further to slide beneath a tandem accumulation of articles until the friction propelling effort effects movement of the leading one or more articles, and the next following article exciting means is effective to propel the remaining articles in the tandem accumulation thereof singly or in multiples.

Another embodiment of this invention relating to an article propelling conveyor comprises a pair of parallel spaced apart series of article supporting rollers or runners defining a path for movement of the articles, a slide surface extending along and between said series of rollers or runners, drag means having an operative conveying span adjacent to said slide surface, a plurality of article motion exciting means detachably connected to said drag means in spaced relation, each of said motion exciting means having a body in sliding contact on said slide surface to support said drag means off of said slide surface and having upper portions formed with oppositely directed sloping surfaces and a mid-surface, said sloping surface and mid-surface being presented to engage the articles to be conveyed, and means adjustably supporting said slide surface for movement into positions where the elevation of said sloping surfaces or mid-surfaces on said motion exciting means is selectively adjustable with respect to said article supporting rollers.

BRIEF DESCRIPTION OF THE DRAWINGS

The preferred embodiments of this invention are shown in the accompanying drawings, wherein:

FIG. 1 is a fragmentary plan view of the opposite end portions of a conveyor having the characteristic feature of the present improvements to be described;

FIG. 2 is a tranverse sectional elevational view taken along line 2—2 in FIG. 1;

FIG. 4 is a fragmentary sectional elevational view taken along line 4—4 in FIG. 1;

DETAILED DESCRIPTION OF THE EMBODIMENTS

Figure 3:
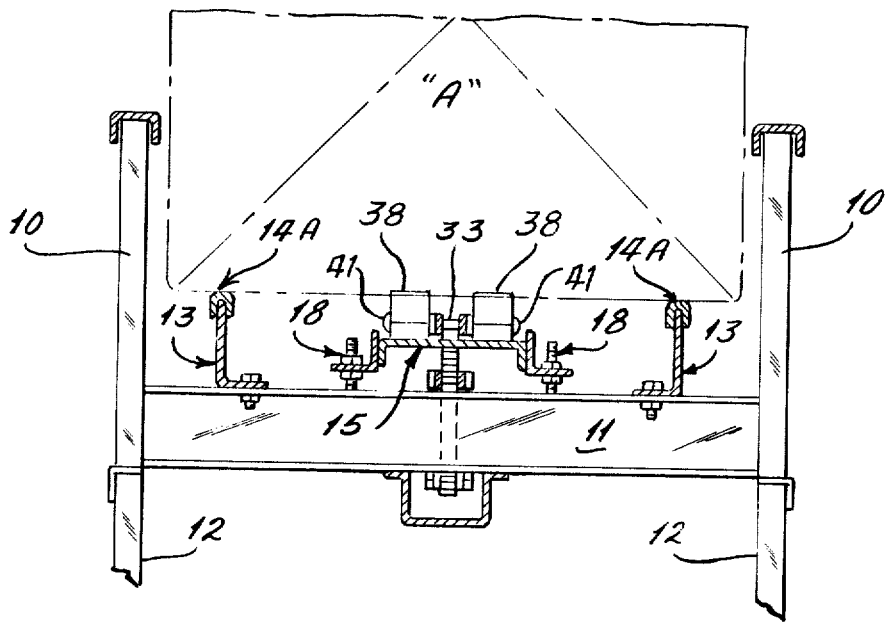
FIG. 3 is a view similar to FIG. 2 but showing a modification in which runners are substituted for rollers.

Referring to FIGS. 1 and 2, the principal structural components of the conveyor are shown to comprise spaced apart high side guards 10 supported by cross members 11, in turn, mounted on legs 12 or in such manner as to maintain the conveyor at a desired elevation, whether it is horizontally level, or inclined up or down in the direction of travel or articles.

Inwardly of each guard 10 there is arranged a pair of longitudinal rails 13 of appropriate shape. The rails are secured to the cross members 11 so as to be fixed in spaced relation to each other and to the guards 10. The rails 13 support a plurality of rollers 14 which collectively have the upper surfaces above the rails 13 to define an article supporting track-way. The space between the rails 13 is occupied by an elongated plate 15 providing a slide way 16 on its upper face. The plate has its longitudinal edges turned down to lend stiffness to the plate, and angle members 17 are secured along each turned edge to additionally stiffen the plate and provide the attachment for adjusting means 18. It is obvious that other roll formed or extended sections may be substituted in place of plate 15 and angles 17 to provide a guided slide surface 16 without altering the intent of the invention. Each adjusting means includes a threaded vertical stud and a pair of nuts threaded on the stud and embracing the horizontal leg of the angle irons 17. The cross members 11 of the assembly are set close enough, or are sufficient in number, to provide support for the rails and the elongated plate 15 and maintain these components in desired alignment and without detrimental sag.

Near one end (the right end in FIG. 1) of the conveyor assembly there is a drive shaft 20 having suitable bearing 21 at one end and a second bearing 22 inboard of the other end so that the shaft end portion can be engaged in a suitable gear box 23. The gear box 23 has its driven pulley 24 engaged by a belt 25 extending into engagement with the pulley 26 of the drive motor 27. The motor 27 powers the shaft 20 on which are affixed a pair of traction wheels 28 spaced apart so that there will be room for a sprocket 29 that will be aligned with the center of the plate slide surface 16. The opposite end of the conveyor is provided with an idler shaft 30 to carry a pair of traction wheels 31 and a sprocket 32, with the sprocket 32 aligned with the sprocket 29. A chain 33 is trained over these sprockets 29 and 32 with an upper span positioned above the plate surface 16 and its lower span below the cross members 11 and supported in a pan 15A suspended from the cross members 11.

The chain 33 (FIG. 4) is made up of two series of side links 34 and 35 having the adjacent ends in lapped relation and secured by pivot pins 36. The pins 36 carry rollers 37 between the side links, as in accordance with standard roller chains. The roller chain is modified at desired places along its span by having elongated pivot pins 36A so that a portion of these pins project laterally beyond the chain links 34 and 35 to provide mounting means for article conveying means 38 at each side which engage and excite article into movement. Each exciter means 38 is made up of a pair of bodies secured to the sides of the chain 33. The bodies have a portion extending below the chain links 34 and 35, as well as the rollers 37, to engage and glide on the surface 16 of the plate 15 and thereby maintain all or substantially all of the chain 33 between exciter means 38 from engaging the surface 16. The upper portion of each body extends above the chain 33 to provide a lug which has slanted surfaces 39 merging in a flat mid-surface 40. It is characteristic of this improvement that each body 38 is quickly replaceable by removing the quick-disconnect chain link keepers 41 that are pressed over the projecting ends of the pins 36A.

The article propelling or conveying exciter means 38, as above described, are adapted to support the roller chain 33 above the plate surface 16 so that noise and chain clatter will be avoided, and further so that wear will be mainly taken by the bodies of the exciter means 38. The means 38 may be made from a number of suitable materials, such as aluminum, brass, plastics or rubber or suitable combination therof, to accommodate the character of articles being conveyed and the level or inclined attitude of the conveyor. Exceptional noise reduction is achieved by forming the means 38 of polyethylene which has the least impact effect on the articles, as also does rubber material. The relation of the components to an article A is well shown in various views of the drawings.

Turning now to FIG. 3 it can be seen that the assembly has been modified over that seen in FIG. 2 by substituting runners or skids 14A for the rollers 14. The runners 14A are placed on the upper elongated edges of the rails 13 and are composed of a material having a low coefficient of friction as these runners furnish the principal support, just as do the rollers 14 of FIG. 2.

It is frequently desirable to deliver articles to the end of a conveyor and retain them until they are removed. In order to provide means to stop or hold the articles on the conveyor of FIG. 1, the right hand end of the assembly is provided with opposed compression pads 42 located at the sides 10 of the conveyor (FIGS. 1 and 2). The pads 42 are connected to the vertical shafts 43 and 44 by links 45 and 46 respectively located near the upper ends. The shafts 43 and 44 are carried by suitable brackets, such as the upper bearing brackets 47 and by lower bearing brackets 48 for the shaft 44. While not shown, it is understood that similar brackets are used for shaft 43. A power unit 49 is connected to the right hand shaft 44 by a crank 50 which is cross connected by a rod 51 to a crank 52 on the shaft 44 at the opposite side. When the power unit 49 is energized to extend, it will close the pads 42 against the sides of an article to arrest or retard its further movement. Obviously the compression pads 42 may be operatively mounted at any chosen location or several locations along the conveyor.

Figure 5:
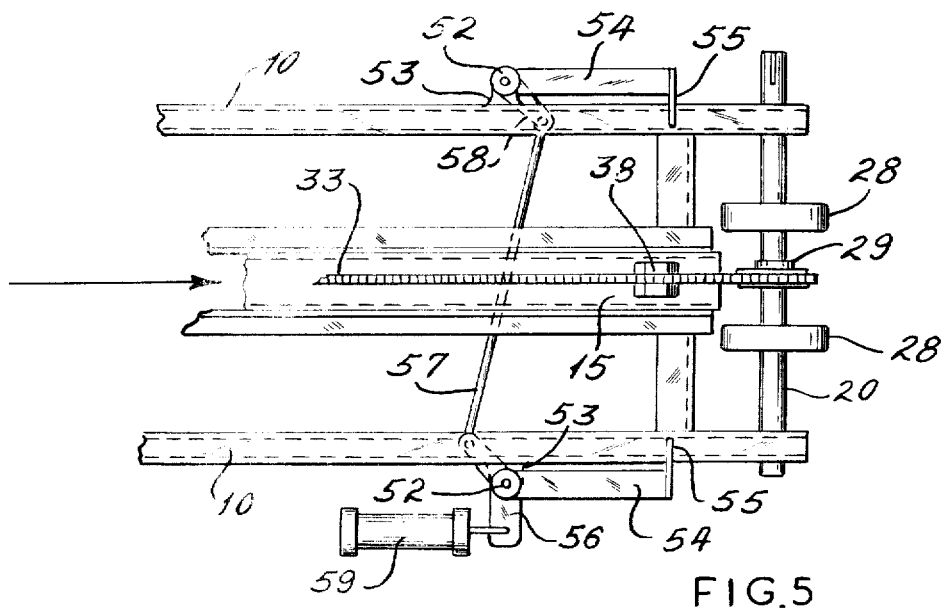
FIG. 5 is a fragmentary plan view of one end of a conveyor having a modified means for stopping the flow of articles.

FIG. 5 shows a different embodiment of article arresting means. Here a single vertical shaft 52 on each side carried in a suitable bearing brackets 53 is employed to support a stop arm 54 having an article engaging element 55 at its outer end. The lower end of the right hand shaft 52 is provided with a crank 56, one end of the crank 56 being connected to a cross link 57 which extends under the conveyor and connects to a crank 58 on the opposite shaft 52. The other end of crank 56 is connected to the power unit which may be fluid motor 59. The opening and closing action of the stop arms can be easily understood from the foregoing description.

Figure 6:
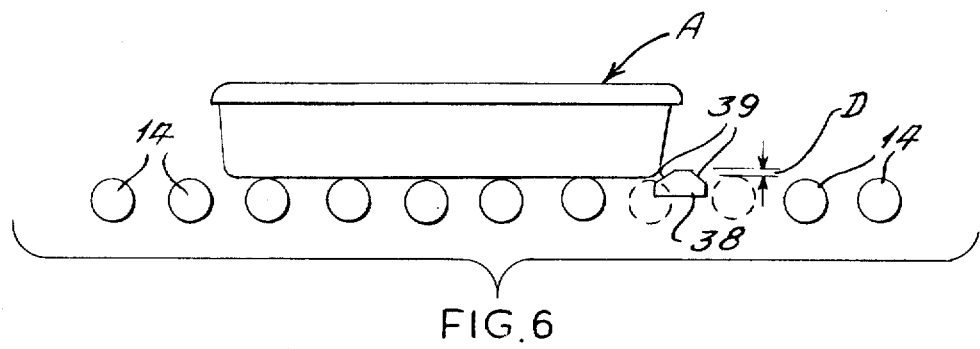
FIGS. 6, 7 and 8 are schematic views of the action of the article motion exciting means in different stages of operation.
Figure 7:
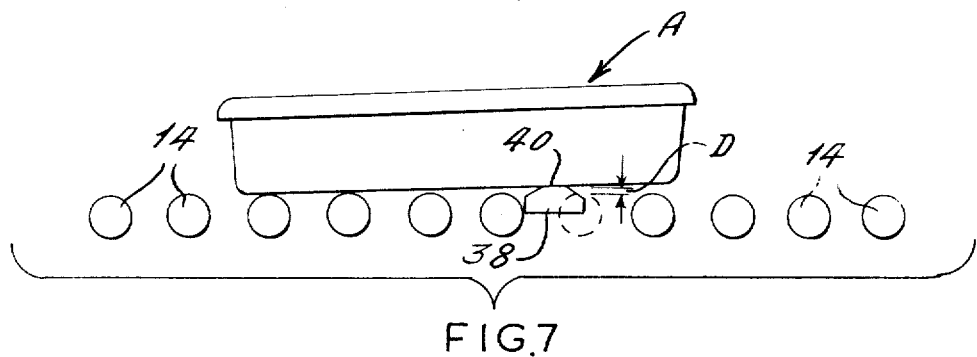
Figure 8:
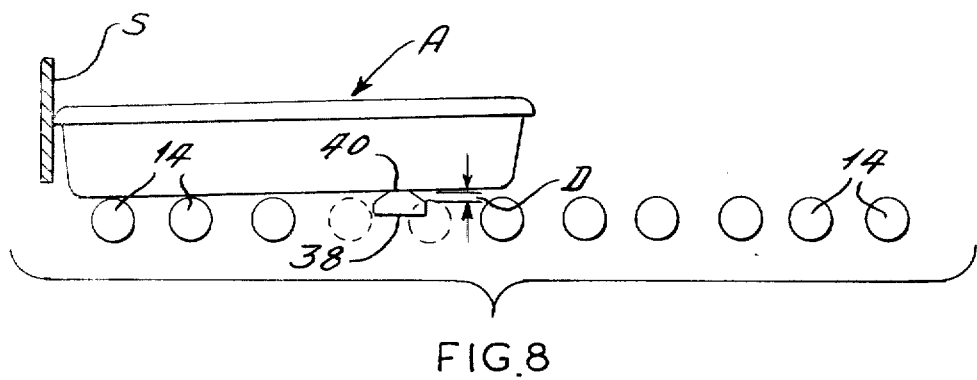

The operation of the conveying exciter means 38 is shown schematically in FIGS. 6, 7, and 8. The views include only the series of rollers which supply the principal support of the article A which in this example is a tote-box but could be any of various sized, but appropriately shaped packages. In FIG. 6 the tote-box A is resting on the roller 14 as an exciter means 38 is drawn along by the roller chain 33. The exciter means 38 form lugs projecting above the chain 33 a distance D above the top line of the rollers 14. The advancing slanting surface 39 engages the tote-box A with a minimum of impact noise or shock to the tote-box. If the tote-box A is empty or lightly loaded the means 38 will merely push the tote-box along in front. However, if the tote-box is loaded even lightly, the means 38 will encounter inertia as well as the normal friction in the rollers 14, and therefore the means 38 will move beneath the tote-box A a distance that will depend on when the friction between the means 38 and the tote-box will exceed the friction in the rollers 14. The effect of the last described condition is shown in FIG. 7, that is the tote-box will be partially lifted off some of the rollers 14 and assume a tilted position which will give maximum effect to the conveying effort of means 38. As seen in FIG. 8, the condition of an obstruction S (which may be the pads 42 in FIG. 1 or the stop means 55 in FIG. 5.) will stop advance of the tote-box A and the means 38 will be caused by the pull of the chain 33 to slide forward under the tote-box and continue on. Each subsequent means 38 on the chain 33 will initate the same action and pass beneath the tote-box but will effect a lifting action to test the obstruction S. When the obstruction S is removed the next means 38 will resume the propelling influence on the tote-box or boxes.

The propelling or conveying effort of each means 38 on the articles A can be selected as needed by varying the distance D (FIG. 6) the surface 40 of each means 38 projects above the top line of the rollers 14. The adjustment is effected (FIG. 1) by turning the nuts of the adjusting means 18 on the studs. In addition, articles A can be positively moved onto or off of the conveyor at either end by the provision of the traction wheels 28 and 31, depending on which direction the means 38 are moved by the roller chain 33. It is especially useful to have the traction wheels at the article loading end so that each article will be moved sufficiently onto the rollers 14 to be properly engaged by the next means 38 that arrives at the loading end.

In the conveyor assembly above described it is to be understood that there are a number of variables that must be considered. The variations possible in selecting the distance D provide a way to increase or decrease the propelling effect of means 38. The spacing along the chain 33 of the means 38 is another variable to be considered in view of the fact that one means 38 has a practical limit in relation to the number of articles A that can be propelled at one time. When the number of articles accumulated in front of one means 38 exceeds the ability to propel all of the articles the means 38 will slide beneath one or more articles until its propelling effort exceeds the frictional resistance in the bearings for the roller supports 14 or the runners 14A. Furthermore, there is a situation often encountered in conveyors when it is desirable to accumulate a group of articles at a designated station, but it is not desired to stop the conveyor or even cause overloading of the conveyor drive. In such a situation the spacing between means 38 cna be adjusted by removing certain of the bodies, and the elevation distance D also can be adjusted so that each means 38 will slide under the accumulated articles without overload effect on the motor 27. Such an accumulation condition can be recognized in FIG. 8 as the obstruction S will cause several articles A to backup at that point. Another variable to be considered is that of varying the travel speed of the draw means relative to the number of exciters 38, thus in another manner to predesign the rate at which loads A will be advanced along the conveyor.

The embodiments above described have the advantages and unique features of exciter means 38 being selectively spaced along the length of the chain 33, the means 38 being made up of removable side bodies so that different materials and sizes of the bodies can be installed and the means 38 being symmetrical so that it will operate in either direction of movement to move articles as desired merely be reversing the drive direction of the motor means 27. The means 38 also have the unique feature of supporting the chain 33 so that only the means 38 are subjected to wear and require replacement from time-to-time.

What is claimed is:

1. Article propelling mechanism for conveying apparatus comprising longitudinally extending and spaced article supporting memebers defining the conveying path, endless drag means having an operative span directed lengthwise between said articles supporting members, a plurality of article motion exciting means connected to said endless drag means in spaced relation, a slide surface extending lengthwise beneath said operative span of the drag means, each of said motion exciting means including a pair of bodies secured to the opposite sides of said endless drag means and extending below said drag means to slidingly engage said slide surface to support and maintain said drag means elevated above said slide surface and out of contact therewith and with upwardly presented friction propelling mid-surfaces presented to engage articles deposited on said article supporting members and oppositely inclined surfaces extending therefrom, said oppositely inclined surfaces rendering the conveyor drag means operative in reverse directions of movement, and power drive means operatively connected to said drag means to repeatedly move said motion exciting means on said slide surface, whereby the friction propelling surfaces engage and propel the articles along said supporting members, said friction propelling surfaces being shaped to present said oppositely inclined sloping surfaces at an elevation relative to said conveying path such that the lead surface can selectively partially slide beneath and propel a single article and can slide beneath the rearmost one of a group of articles in tandem accumulation in said conveying path so as to lift the rearmost article for obtaining an increase in the frictional propelling effort to effectively propel a group of articles.

2. The article propelling mechanism for conveying apparatus set forth in claim 1 wherein said conveyor apparatus has opposite article loading and unloading ends, rotary shaft means at said ends operatively engage with said endless drag means and defining the ends of the operative span of said drag means, and traction wheel means mounted on said shaft means at least at one end to engage and effect positive movement of each article relative to said supporting means, said traction wheel means being disposed on each side of said drag means to move an article relative to said exciter means.

* * * * *